United States Patent [19]

Grab et al.

[11] 4,318,771

[45] Mar. 9, 1982

[54] DEVICE FOR THE FORMATION OF GRANULATED OR AGGLOMERATED SUBSTANCES

[75] Inventors: Erwin Grab, Rummingen; Werner Glatt, Binzen, both of Fed. Rep. of Germany

[73] Assignee: Glatt Maschinen-und Apparatebau AG, Pratteln, Switzerland

[21] Appl. No.: 169,466

[22] Filed: Jul. 16, 1980

[51] Int. Cl.[3] .............................................. B01D 1/14
[52] U.S. Cl. ................................ 159/16 R; 23/313 R
[58] Field of Search ........ 23/313 R, 313 AS, 313 FB; 159/16 R; 422/292, 293, 297–301

[56] References Cited

U.S. PATENT DOCUMENTS

| | | | |
|---|---|---|---|
| 3,645,684 | 2/1972 | DeCuir | 23/313 R |
| 3,738,821 | 6/1973 | Barber | 23/313 FB |
| 3,743,539 | 7/1973 | Kroyer et al. | 159/16 R |
| 3,884,645 | 5/1975 | Kinne | 23/313 FB |
| 4,027,624 | 6/1977 | Motoyama | 118/303 |

FOREIGN PATENT DOCUMENTS

| | | |
|---|---|---|
| 2075523 | 8/1971 | France . |
| 968633 | 9/1964 | United Kingdom . |
| 1027375 | 4/1966 | United Kingdom . |

*Primary Examiner*—Norman Yudkoff

*Attorney, Agent, or Firm*—Fleit & Jacobson

[57] ABSTRACT

A device for the formation of a granulated substance. The device has a container which is open at the bottom and can be closed off by a movable bottom member of solid construction. Additionally, two other bottom members, which have lattices with different mesh widths or openings, can be optionally moved under the container instead of the solid member, which bottom member does not have openings. A stirrer is arranged in the container, which has a top container section that contains a filter connected to a suction fan. In order to form a granulated substance, the container is first closed off by the solid bottom member and a powdery material and a liquid are introduced into the container for mixing with each other by means of a stirrer. Subsequently, the solid bottom member is replaced by one of the lattice bottom members and warm air is drawn into the container. In this way, the humid mixed material is whirled about, dried and granulated. Then, the granulated material is discharged from the container and simultaneously sifted. Thus, a powdery substance of different components can be mixed with a liquid in the container while avoiding a disintegration of the powder components and, subsequently, the mixture can be dried and granulated in the same container without any intermediate transporting.

8 Claims, 5 Drawing Figures

DEVICE FOR THE FORMATION OF GRANULATED OR AGGLOMERATED SUBSTANCES

BACKGROUND OF THE INVENTION

1. Field of the Invention

The present invention relates to devices for the formation of granulated or agglomerated substances, in general, and to a device in which solid substances and liquids can be mixed and dried in the same container during formation of the granulated or agglomerated substances, in particular.

2. Description of the Prior Art

Fluidized bed driers which have a container for holding the substance to be dried are known from Swiss Pat. No. 444,046 as well as from the corresponding U.S. Pat. No. 3,394,468 and from Swiss Pat. No. 475,786. The bottom of the container is provided with openings. The space above the container contains a filter and is connected with a suction fan. During operation, warm air is supplied to the area under the bottom of the container. The warm air, with the help of the suction fan, is drawn through the container and the granular substance contained therein. In doing so, the substance to be treated is whirled about.

For the granulation process, liquid is sprayed into the whirling space through at least one spray nozzle arranged at the top of the container. In this way, the liquid is mixed with the whirled-about granular substance and a granulated or agglomerated substance is formed. In order to dry the substance, warm air continues to be drawn through the granulated or agglomerated substance for a certain period of time after the termination of the spraying process. When the suction fan is cut out, the granulated substance settles in the container. The container, after being pushed out of the structure of the device, is emptied and charged with a new substance to be treated.

The granular material to be treated consists frequently of a mixture of different solid substances. The granules consisting of different solid substances have, in general, different densities and are possibly also of different sizes. The result is that a certain fractioning takes place during the whirling process. The granulated substance formed with the spraying of the whirled-about granules becomes nonhomogeneous which represents a considerable disadvantage.

Granulating devices and a device for the coating of solid substance particles are known from German Interpretation Publication Nos. 23 41 504 and 19 37 424, as well as German Disclosure Publication Nos. 26 43 121, 25 51 578 and 24 18 552. The devices disclosed in these documents are similarly designed as fluidized bed driers, as described above, and some of these devices additionally include a rotary stirrer or chopper arranged in the container. Also, the material to be treated by these known devices is whirled about and sprayed with a liquid in the whirling space. Thus, all of the prior art devices just described have the disadvantage that a certain fractioning and disintegration takes place during the whirling-about and spraying of a mixture.

This disadvantage has been eliminated to a certain extent by first mixing the solid substances in a mixer in a dry condition. This dry mixture is then sifted on a screen and transferred into a mixing-kneading device which is also supplied with the liquid required for the granulation process. Subsequently, the powdery mixture and the liquid are stirred with stirrers and kneaded in the mixing-kneading device. The humid substance formed in this way is then transferred into a granulating press in which the humid substance is pressed through a screen plate. The rod-shaped material formed in this manner is then charged into the mixing container of a fluidized bed drier and dried there with warm air until the material is more or less crumbled. When the material is dried and crumbled, it is taken out of the drier and transported into a separate screening device where it again goes through a screening process. The granulated material thus formed can then be introduced, for example, into a preforming press for formation into tablets.

The process just described actually produces granulated material with a homogeneous composition but has the disadvantage that, when pressed through the screen plate of the granulating press, particles are formed with a regular cylindrical shape and with firm cylindrical surfaces which make subsequent tablet formation more difficult. Another disadvantage is that a comparatively large number of separate devices are required to form the granulated material, and the intermediate product must be taken manually from one device to the next by work personnel.

A granulating device is also known from German Disclosure Publication No. 25 38 267 in which components, used in the formation of granulated material, are first mixed in dry condition in a container and subsequently granulated in the same container by adding a liquid, mixing continuously, and finally drying with a flow of air. A mixing tool which can be rotated around a vertical axis is available in the container for the mixing operation. The air, serving drying purposes, can be introduced into the container through a socket penetrating into the upper area of the container as well as through the shaft of the mixing tool. However, this kind of air supply results only in a relatively slight and irregular whirling-about of the mixed material and, thus, in a correspondingly low drying effect. Since the mixed material is to whirled upward, the air introduced from above has a comparatively low effect. Furthermore, because the air is supplied from below through the shaft of the mixing tool into the container, it has a whirling effect only across a small area of the container bottom. Additionally, only a comparatively small amount of air per unit time can be introduced through the shaft.

SUMMARY OF THE INVENTION

The present invention relates to a device for the formation of a granulated substance. The device has a container which is open at the bottom and can be closed off by a movalbe bottom member of solid construction. Additionally, two other bottom members, which have lattices with different mesh widths or openings, can be optionally moved under the container instead of the solid bottom member, which does not have openings. A stirrer is arranged in the container, which has a top container section that contains a filter connected to a suction fan. In order to form a granulated substance, the container is first closed off by the solid bottom member and a powdery material as well as a liquid are introduced into the container for mixing with each other by means of a stirrer. Subsequently, the solid bottom member is replaced by one of the lattice bottom members and warm air is drawn into the container. In this way, the humid mixed material is whirled about, dried and granulated. Then, the granulated material is discharged from the container and simultaneously sifted.

It is thus a primary object of the present invention to create a device which solid substances can be mixed with a liquid and granulated or agglomerated as well as dried in the same container whereby no disintegration takes place and all operations are carried out with a high degree of efficiency.

It is another object of the present invention to provide a device in which a powdery substance of different components can be mixed with a liquid in a container while avoiding a disintegration of the powder components.

It is a further object of the present invention to provide a device in which a mixture of a powdery substance of different components and a liquid can be dried and granulated in the same container without any intermediate transporting.

These and other objects of the present invention, as well as many of the attendant advantages thereof, will become more readily apparent when reference is made to the following description taken in conjunction with the accompanying drawings.

DETAILED DESCRIPTION OF THE DRAWINGS

Figure 1:
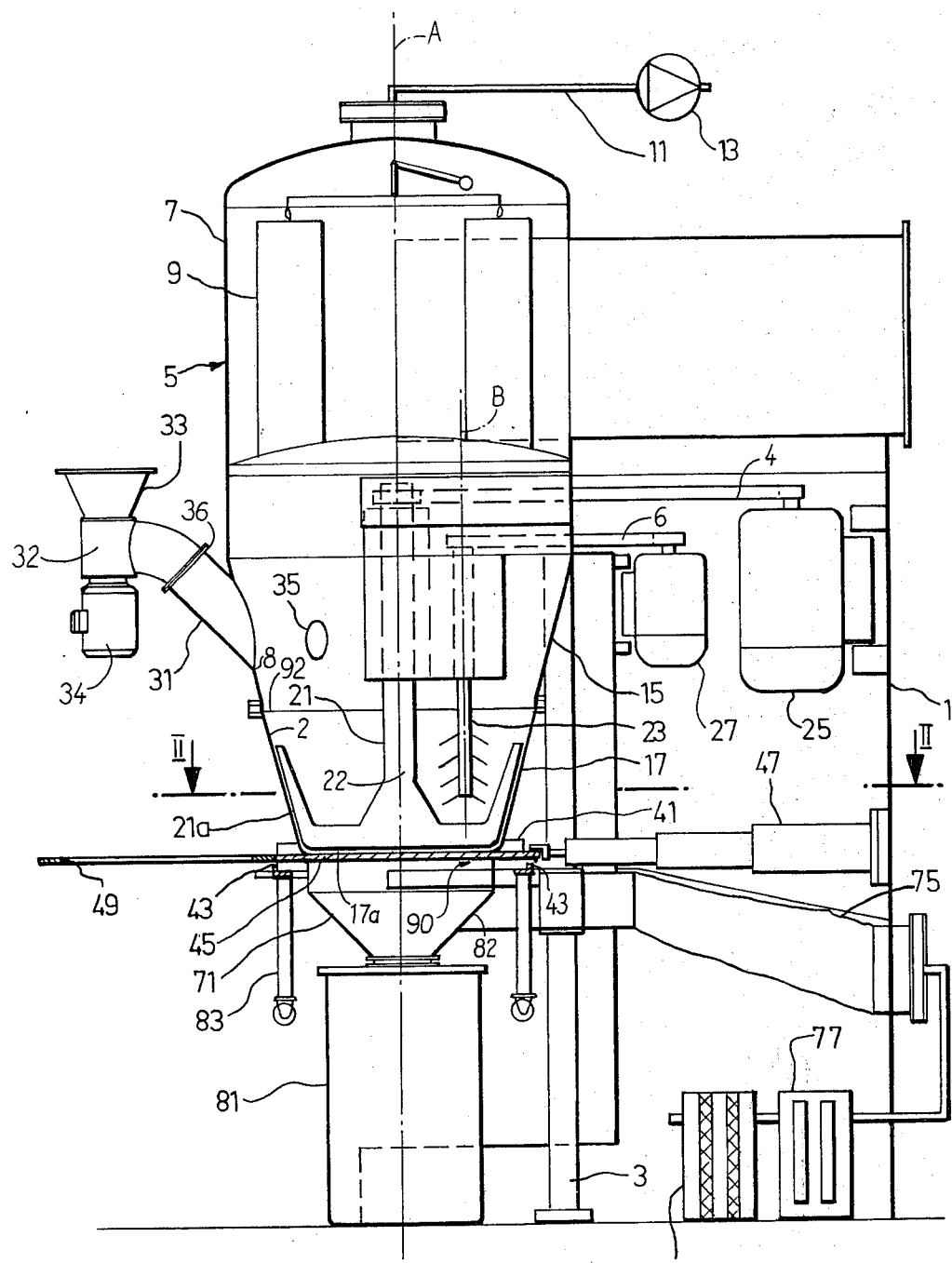
FIG. 1 is a schematic vertical cross-section through a device for the formation of granulated or agglomerated material.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

The device for granular enlargement, i.e., for the formation of granulated or agglomerated substances, shown in FIG. 1, has a structure 1 with verticle columns 3. A multisectional container 5 is arranged vertically in the structure 1. An upper container section 7 contains a multisectional filter 9 and, as shown schematically, is connected with suction fan 13 through a line 11. Below the container section 9, there is a downward conically tapered container section 15 which is followed by another downward conically tapered container section 17. As will be explained in more detail, the inner space of the container section 17 serves as a mixing chamber during a certain operational phase. The inner spaces of container sections 15 and 17 serve together as a whirling chamber during another operational phase.

A stirrer 21, arranged in the two container sections 15 and 17, has a shaft 22 which is pivoted coaxially to the vertical symmetry axis A of the container 5. The stirrer has stirring arms 21a whose free ends are bent upward and run a short distance along the inner surface 2 of the container section 17. In addition, a chopper 23 is arranged in the two container sections 15 and 17. The chopper is pivoted about a vertical axis B which is spaced from and off center of the container symmetry axis A. The stirrer 21 and the chopper 23 are each connected to a motor 25 or 27, respectively, through a belt drive 4, 6.

On the side 8 of the container section 15 is a closable inlet socket 31 for receiving the supply of the powdery material to be treated. A screening device 33 with a screening drum 32 driven by a motor 34 is flanged at 36 to the inlet socket 31. The container section 15 is additionally provided on its side 8 with a closable inlet 35 for receiving the supply of a liquid substance.

The bottom of container section 17 contains an opening 17a around which a ring 41 is welded. This construction can be seen clearly in FIGS. 2 and 3.

Figure 2:
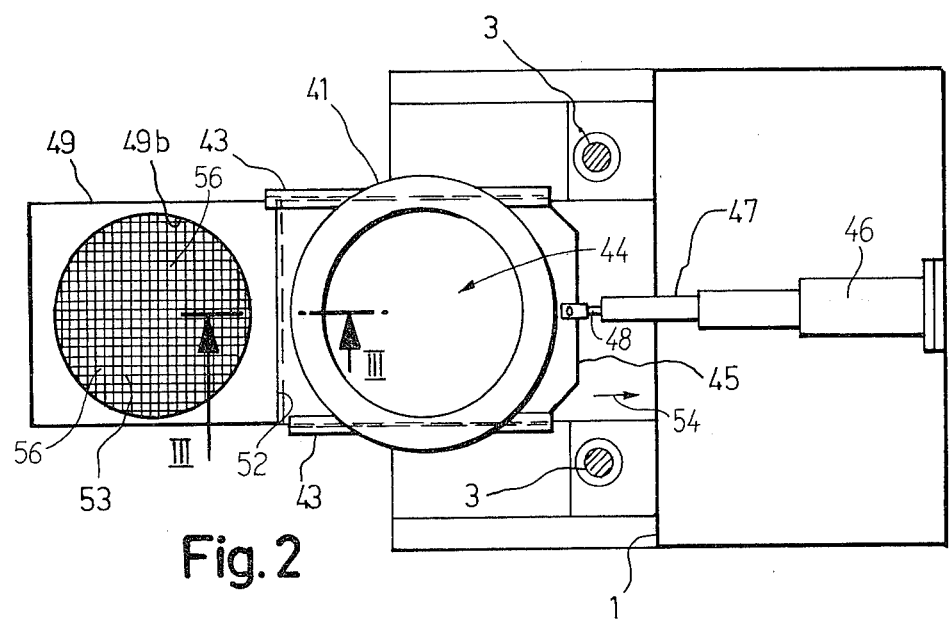
FIG. 2 is a cross-section along the line II—II of FIG. 1, whereby the mixing container has been omitted.
Figure 3:
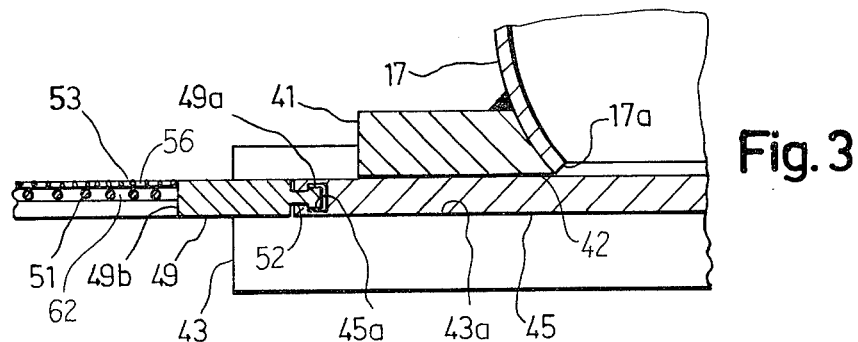
FIG. 3 is a cross-section along the line III—III of FIG. 2, whereby a portion of the mixing container is plotted.

A pair of guides 43, each running horizontally on each side of the lower edge 42 of the container section 17, is fastened to the container section 17 by a notch 43a. A planar bottom member 45 is received in the notches 43a. This bottom member is formed by a compact, generally rectangular plate which is closed in the area 44 that is under the opening 17a as shown in FIGS. 1, 2 and 3. Apart from that, the bottom member 45 is placed in such a way that it closes off tightly the opening 17a. The bottom member 45 can be moved along the guides 43 by means of an adjustment system 47 which has a hydraulic cylinder 46 fastened to the structure 1 and a detachable piston 48 connected with the bottom member 45.

The bottom member 45 is provided with a notch 45a on its edge running diagonally to its sliding direction away from the adjustment system 47 whose bottom portion if broadened. A second planar bottom member 49 is provided with a rib 49a on one of its edges 52. The rib is T-shaped in its cross-section and is configured to engage with notch 45a. In this manner, the two bottom members 45 and 49 are rigidly connected with each other in the sliding direction of the adjustment system 47 as indicated by arrow 54 in FIG. 2. Proceeding from the position shown in FIGS. 1, 2 and 3, the two bottom members 45 and 49 can be moved sufficiently towards the left that the notch 45a gets out of the range of the guides 43. In this position, the rib 49a of the bottom member 49 can be pushed out of the notch 45a diagonally to the guides 43 and, thus, the two bottom members 45 and 49 can be separated from each other.

The bottom member 49 is provided with an opening 49b of approximately the same size as the opening 17a. A relatively rigid, coarse-meshed carrying lattice, or screen, 51 is fastened in this opening together with a fine-meshed lattice, or screen, 53 which lies above and is carried by lattice 51. The mesh width of the fine-mesh lattice 53 may, for example, be approximately 0.1 mm. The holes or interstices 56 between the meshes of the lattice 53 serve, as will be explained, as passage openings for air or another gas. The openings of the coarse-meshed lattice 53 are denoted as 62.

Figure 4:
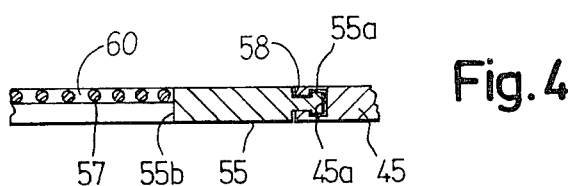
FIG. 4 is a cross-section in accordance with FIG. 3, whereby a third bottom member designed as a screen is attached to a solid bottom member instead of the bottom member with the openings for the gas supply.

With reference to FIG. 4, a third bottom member 55 has a rib 55a on one of its edges 58. The rib 55a is designed in the same way as the rib 49a of bottom member 49. Bottom member 55 can be connected with bottom member 45 in a detachable fashion instead of with bottom member 49 as is shown if FIG. 4. Bottom member 55 is provided with an opening 55b which is approximately the same size as opening 17a. A lattice is placed into the opening 55b and serves as a screening device 57, the mesh width of which is approximately in the range of 1 to 10 mm. The passage openings or interstices 60 between the meshes of the screening device 57 have a considerably larger inner width than the openings between the meshes of the lattice 53.

Again with reference to FIG. 1, a funnel shaped container section 71 is arranged under the two guides 43 and the bottom members underneath the container section 17. The inner diameter 90 at the upper end of the container section 17 is at least equal to the inner diameter of the openings 49b and 55b. From there the container section 71 conically tapers downward. The container section 71 is connected with the container section 17 and the guides 43 in a detachable fashion in such a way that container section 71 rests tightly against the guides 43 and the bottom members under the container section 17. The container sections 17 and 71 as well as the guides 43 are vertically adjustable by hydraulic lifters (not shown). There is a gasket 92 at the junction point between the container sections 15 and 17 which provides for a sealed connection when the container section 17 is pushed upward by the hydraulic lifters.

The container section 71 is additionally provided with a lateral opening 82 where a movable gas inlet line 75 is connected. The gas inlet line 75 is also operatively connected with a schematically shown gas heater 77 and filter 79. There is a closable container 81 located under the funnel-shaped container section 71. The container 81 receives the produced granulated or agglomerated material. Moreover, an undercarriage 83 with a frame and four legs each with a caster is fastened to the container section 17 in a detachable fashion.

With reference to FIGS. 1, 2 and 3, the mode of operation of the device will now be explained.

For the first operating phase, the lower opening 17a of the container section 17 is tightly closed off by the bottom member 45 as shown in FIGS. 1, 2 and 3. Subsequently, a given amount of solid, fine-granular material is introduced through the screening device 33 and the inlet 31. This can be, for example, a mixture whose granules consist of different materials. Additionally, a given quantity of a liquid or of a suspension with a liquid component is supplied through the inlet 35. The supplied quantities are measured in such a way that the container section 17 is not entirely filled.

Next, the inlets 31 and 35 are tightly closed off and the components in the container section 17, which now serves as a mixing container, are stirred and kneaded with the stirrer 21 and the chopper 23 so that a humid substance is formed in which the different components are uniformly distributed.

When this mixing process, which was accomplished without a supply of gas, is terminated, the bottom members 45 and 49, which are connected with each other, are moved towards the right along the guides 43 by means of the adjustment system 47 so that the opening 49b with the lattice 53 moves under the opening 17a. Furthermore, the suction fan 13 and the gas heater 77 are now put into operation. The suction fan 13 draws in air through the filter 79. The air is heated in the gas heater 77 and then flows into the container section 17 through the line 75 and the passage openings of the lattice 53. The air then flows upward through the container sections 17 and 15. In this way, the material in the container section 17 is whirled about. Thus, the container section 17 and the lower area of the container section 15 form a whirling chamber. Granulated or agglomerated bodies, i.e., granules, are formed from the humid substance through the whirling process. The granules have larger dimensions than the granules of the material supplied through the inlet 31. At the same time, the drying of the mixed material takes place. If appropriate, the stirrer 21 and the chopper 23 can also be put into motion during all or part of the whirling process. The air causing the whirling effect then passes through the filter 9 and flows out of the container 5 through the line 11 and the suction fan 13.

When the material in the container 17 is transformed into a dry granulated or agglomerated substance, the suction fan 13 and the gas heater 77 are stopped so that all of the formed granulated or agglomerated substance settles in the container section 17. Furthermore, the bottom members 45 and 49 are now temporarily moved sufficiently to the left so that bottom member 45 closes off the opening 17a and the bottom member 49 can be separated from bottom member 45. Subsequently, bottom member 55 is connected with bottom member 45 as can be seen in FIG. 4. Now, the two bottom members 45 and 55 are moved sufficiently to the right so that the opening 55 with the sifting device 57 is positioned under the opening 17a. After this is accomplished, the stirrer 21 can be put into motion. A section of the stirring arms 21a moves a short distance across the sifting device 57. The stirring arms are designed in such a way that the material in the container section 17 is moved across the sifting device 57 and pressed through it. When the granulated or agglomerated material is of proper granular size or has been reduced to that size by the stirrer arms, the material then moves downward into the container 81 through the sifting device 57 and the funnel-shaped container section 71. When the container 81 is filled, it can be removed and replaced by another empty container.

Therefore, during the operation of the device, first a mixing of dry and liquid components, then a whirling-about with granulation and simultaneous drying, and, finally, a sifting can be accomplished in the same container 5 without intermediate transportation of the material to be treated. Since the mixing process is accomplished by stirring and kneading, practically no fractioning takes place even if the powdery initial product consists of a mixture of several components having different densities. Therefore, a granulated or agglomerated substance can be produced which has a very uniform composition. Apart from that, it is quite possible to introduce into the container section 17 different solid substances and to mix these initially with each other without adding a liquid and, if necessary, to crush them with the chopper 23.

The mesh width of the lattice 53 must, of course, be such that the mixed material does not fall through the lattice 53 when the material is whirled about and granulated. Inversely, the mesh width of the sifting device 57 must be such that the granulated material of desired size can pass through the sifting device.

When the container 5 and the components arranged therein must be cleaned, the connection between the bottom member 45 and the adjustment system 47 is released. Either all bottom members can be pulled out of the guides 43 or one of the bottoms can be left under the container section 17. Subsequently, the container sections 17 and 71 can be lowered together with the guides 43 by accordingly actuating the hydraulic lifters. Then, either the line 75 is separated from the container section 71 or the latter from the container section 17 and the container section 17, either with or without the container section 71, is rolled away on the undercarriage 83. The container 5 and the components contained therein then become accessible and can be easily cleaned. After the cleaning, the container sections 17 and 71 are put back under the container section 15 and are lifted again into the drawn position with the help of the mentioned hydraulic lifters.

In this connection, it should still be pointed out that the possibility of removing the container section 17 permits introducing the material to be mixed into the container section 17 when it is separated from the remaining sections of the container 5. Furthermore, the produced granulated material could also be taken away in the container section 17. The bottom member 45 must then, of course, remain under the container section 17 when dismounting and remounting the container sections 17 and 71 and is then moved away with container section 17.

Figure 5:
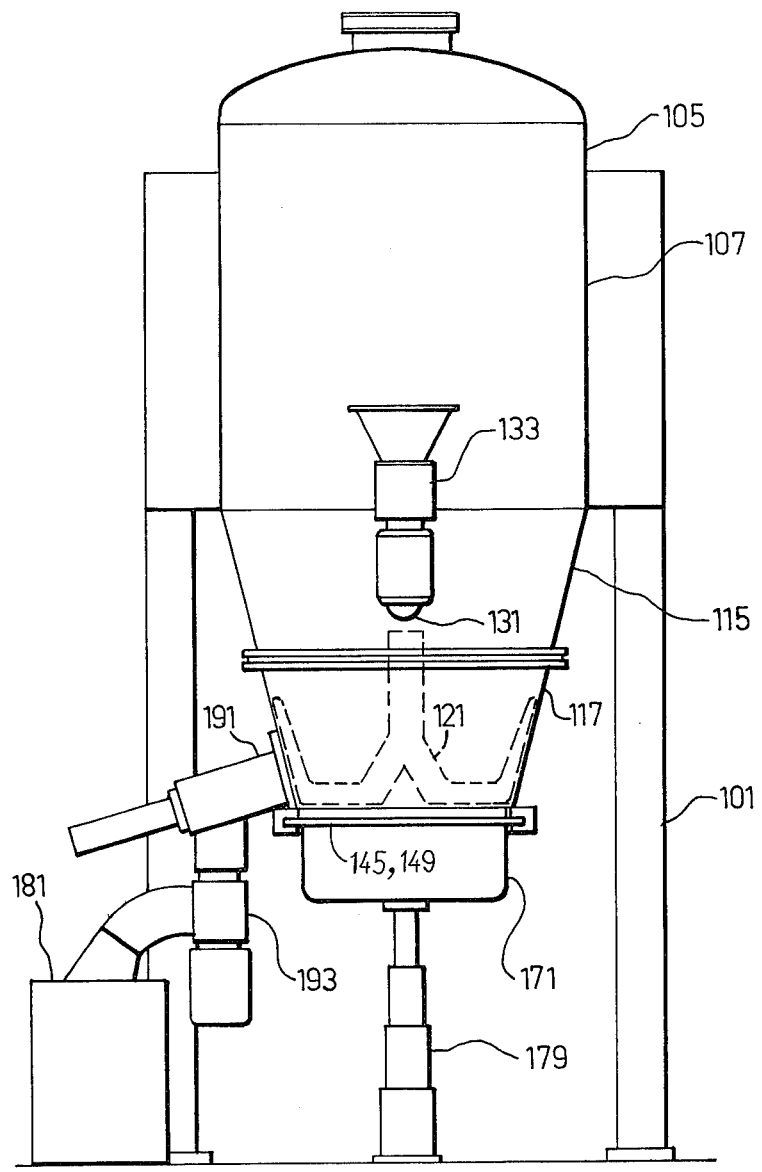
FIG. 5 is a lateral view of an alternative embodiment of the device of the present invention.

The alternative embodiment of the device shown in FIG. 5 has a structure 101 and a container 105 which is composed of container sections 107, 115 and 117. A sifting device 133 communicates with the inner space of the container section 115 through an inlet 131. In addition, a stirrer 121 is pivoted in the container 105. There are also two bottom members 145 and 149 connected with each other. One of the bottom members is without openings, similar to bottom member 45, and the other has passage openings for a gas, similar to bottom member 49. There is a gas supply chamber 171 under the container section 117 and under the bottom member 145 directly underneath the latter to which a movable gas supply line is connected which is pushed upward by means of a hydraulic lifter 179. Thus, the device shown in FIG. 5 is similar, to a large extent, to the device previously described with reference to FIGS. 1, 2 and 3.

The essential difference between the two devices is that the device according to FIG. 5 does not have a bottom member with a sifting device corresponding to bottom member 55. Instead, the container section 117 which is conically tapered in a downward direction is provided with a lateral outlet 191 which can be closed off. A sifting device 193 with a sifting drum and a motor is connected to it. The outlet of the sifting device 193 ends in a container 181 to receive the formed granulated material.

The operation of the device shown in FIG. 5 is also accomplished in a similar manner to that of the previously described device. The essential difference in the operation is that the formed granulated material is not discharged vertically downward from the container section 117 but laterally through the sifting device 193. The stirrer 121 rotates during the sifting process so that it centrifuges the granulated material towards the outside. In this way, it is guaranteed that all granulated material leaves the container section 117 through the outlet 191.

Although the present invention has been shown and described in terms of a specific preferred embodiment, it will be appreciated by those skilled in the art that changes or modifications are possible which do not depart from the inventive concepts described and taught herein. Such changes and modifications are deemed to fall within the purview of these inventive concepts.

For example, a motor with a rack and pinion could be used as the adjustment system 47 for moving the bottom members instead of a hydraulic cylinder. In addition, a bottom member carrier, rotating around a vertical axis, could be provided to carry two or three bottom members positioned on the same plane. The bottom members could then be rotated under the container section 17 in which the mixing and fluidized bed formation takes place. In this case, the bottom members can be formed as a continuous plate which has an area without openings and one or two openings each provided with a lattice.

It is also contemplated to provide means for arranging the bottom members on top of each other. For example, in the case of the alternative embodiment shown in FIG. 5 where only two bottom members 145 and 149 are necessary, the bottom member 149 with the openings for the passage of the gas could be rigidly fastened to the structure 101. The bottom member 145 without openings, which has the purpose of tightly closing off the section 117, could then be arranged in a movable manner above the bottom member 149 with the passage openings. Depending on the operation to be performed, the bottom member 145 without openings could slide above the bottom member 149 with the openings or could be pulled away from it.

When a bottom member with openings is arranged underneath a bottom member without openings, the lower bottom member, when the upper one closes off the bottom opening of the container, can be removed in some way and replaced by another bottom member. For example, the bottom member 49 with the openings for the passage of the gas can be replaced, in this case, by the bottom member 55 designed as a sifting device.

If the material to be treated cannot be whirled about in air, protective gas can, of course, also be supplied into the whirling chamber instead of air. Additionally, a closed gas cycle can be provided.

The sealing between the bottom members 45, 49 and 55 and the container 17 is accomplished simply by means of metal surfaces placed on top of each other in the case of the previously described embodiment as shown in FIG. 3. If the sealing, achieved in this fashion, should not be sufficient when the granulation is effected, for example, in a protective gas atmosphere, gaskets of rubber-elastic material can, of course, be provided additionally.

What is claimed is:

1. A device for the formation of granulated or agglomerated substances, said device comprising:
   container means having a top portion and an open bottom and adapted to receive at least one solid substance and at least one liquid substance;
   a first bottom member for closing off the open bottom of said container means;
   a second bottom member having a plurality of gas passage openings;
   mounting means for detachably mounting said first and second bottom members in horizontal engagement with said open bottom;
   stirring means disposed in said container means for mixing said substances;
   flowing means for introducing an upward flowing gas through said open bottom of said container means, said gas, when flowing upward, causing said substances to be dried by whirling within said container means; and
   a third bottom member having a passage screen with openings of larger size than the gas openings of said second bottom member, said third bottom member capable of being positioned under said open bottom of said container means so that the mixed substances can be shifted through said third bottom member after whirling.

2. The device according to claim 1, further comprising means for detachably connecting said first and second bottom members to each other.

3. The device according to claim 1, wherein said second bottom member comprises a screen having a surface area with said gas passage openings being uniformally distributed over said area.

4. The device according to claim 1, wherein said flowing means comprises means for introducing said gas into said open bottom, and means for drawing said gas through said container means.

5. The device according to claim 4, wherein said means for drawing comprises a suction fan disposed in said top portion of said container means.

6. The device according to claim 4, further comprising means for heating said gas prior to introduction into said container means.

7. A device for the formation of granulated or agglomerated substances, said device comprising:
container means having a top portion and an open bottom and adapted to receive at least one solid substance and at least one liquid substance;
a lateral opening in said container means;
sifting means for sifting of granulated or agglomerated substances;
means for connecting said sifting means to said opening;
a first bottom member for closing off the open bottom of said container means;
a second bottom member having a plurality of gas passage openings;
mounting means for selectively placing said first and second bottom members in engagement with said open bottom;
stirring means disposed in said container means for mixing said substances; and
flowing means introducing an upward flowing gas through said open bottom of said container means, said gas, when flowing upward, causing said substances to be dried by whirling within said container means.

8. A device for the formation of granulated or agglomerated substances, said device comprising:
container means having a top portion and an open bottom and adapted to receive at least one solid substance and at least one liquid substance;
an inlet into said container means;
sifting means connected to said inlet for supplying sifted, solid substances into said container means;
a first bottom member for closing off the open bottom of said container means;
a second bottom member having a plurality of gas passage openings;
moutning means for selectively placing said first and second bottom members in engagement with said open bottom;
stirring means disposed in said container means for mixing said substances; and
flowing means for introducing an upward flowing gas through said open bottom of said container means, said gas, when flowing upward, causing said substances to be dried by whirling within said container means.

* * * * *